June 8, 1954  H. L. SPAIGHT  2,680,370
MASONRY JOINT STRUCTURE
Filed July 1, 1950  3 Sheets-Sheet 1
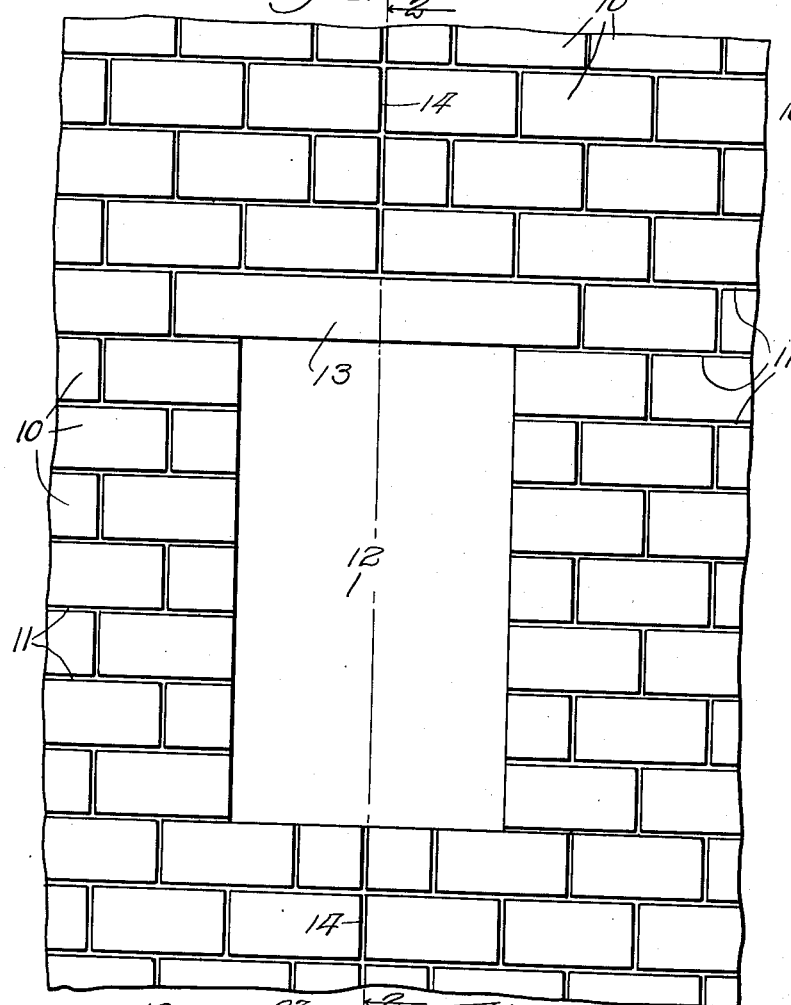
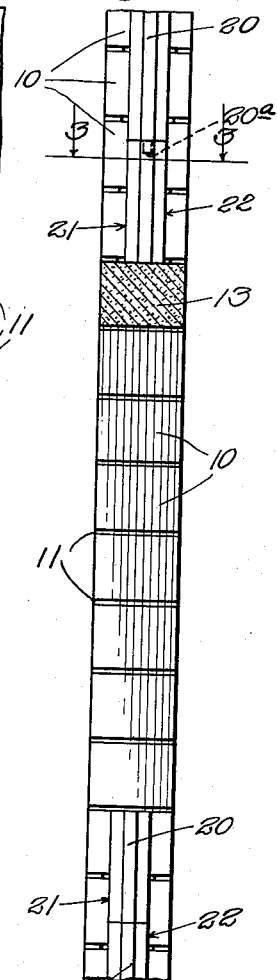
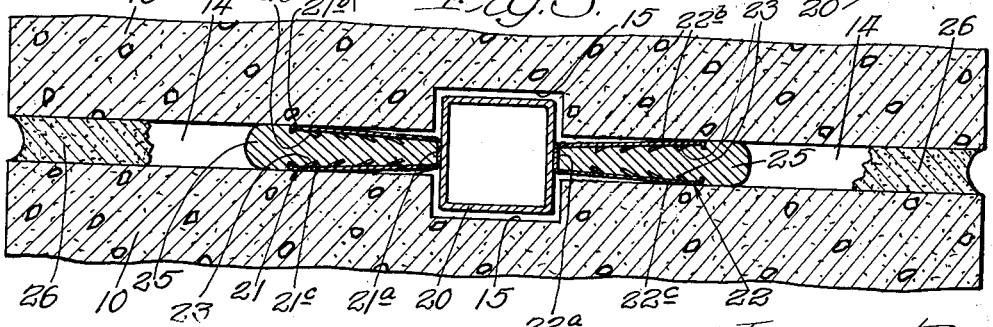
Inventor:
Harold L. Spaight,
By Schroeder, Merriam,
Hofgren & Brady, Attys.

June 8, 1954  H. L. SPAIGHT  2,680,370
MASONRY JOINT STRUCTURE
Filed July 1, 1950  3 Sheets-Sheet 2
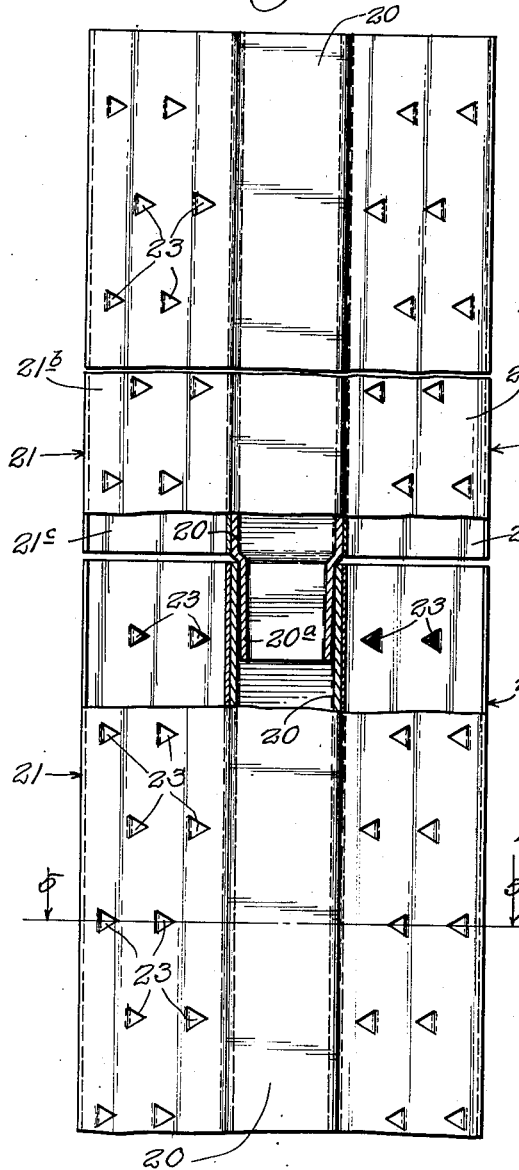
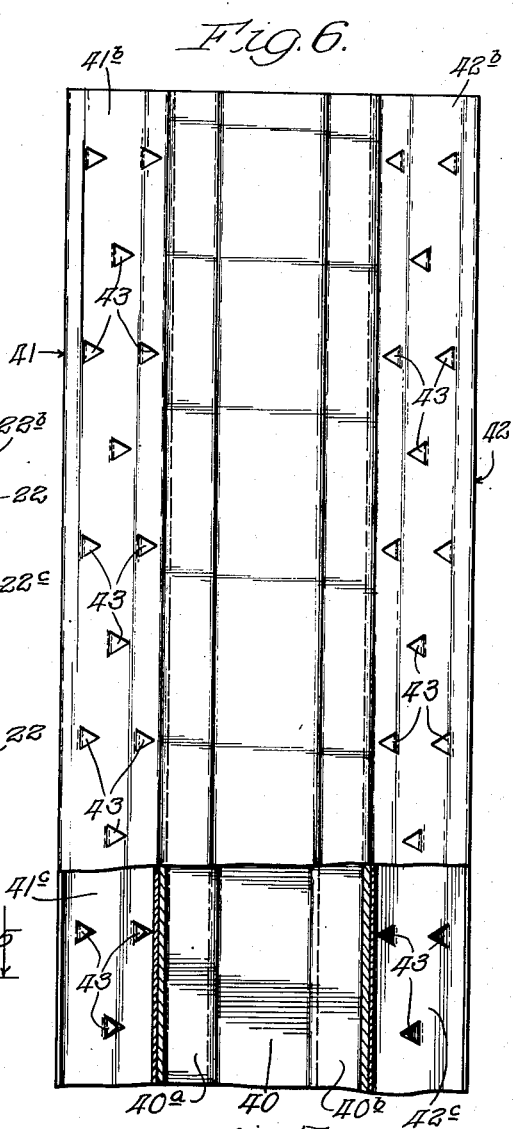
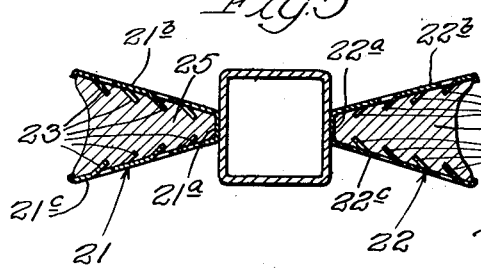
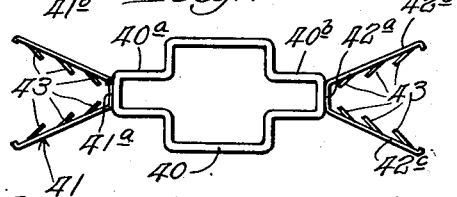
Inventor:
Harold L. Spaight,
By Schroeder, Merriam,
Hofgren & Brady, Attys.

June 8, 1954   H. L. SPAIGHT   2,680,370
MASONRY JOINT STRUCTURE
Filed July 1, 1950   3 Sheets-Sheet 3
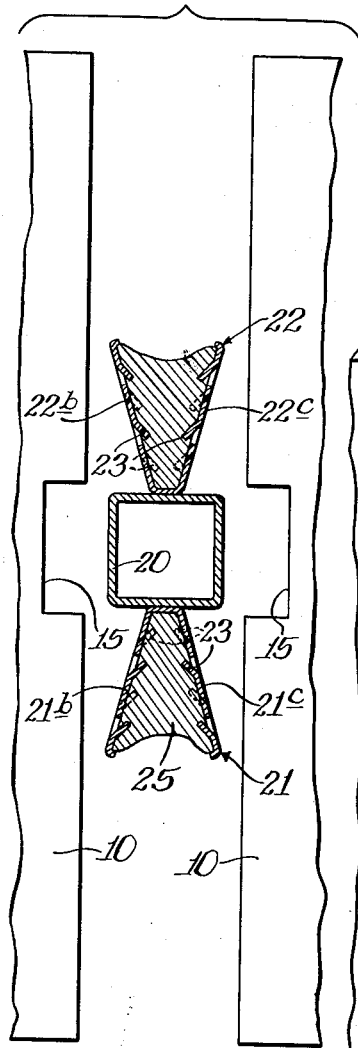
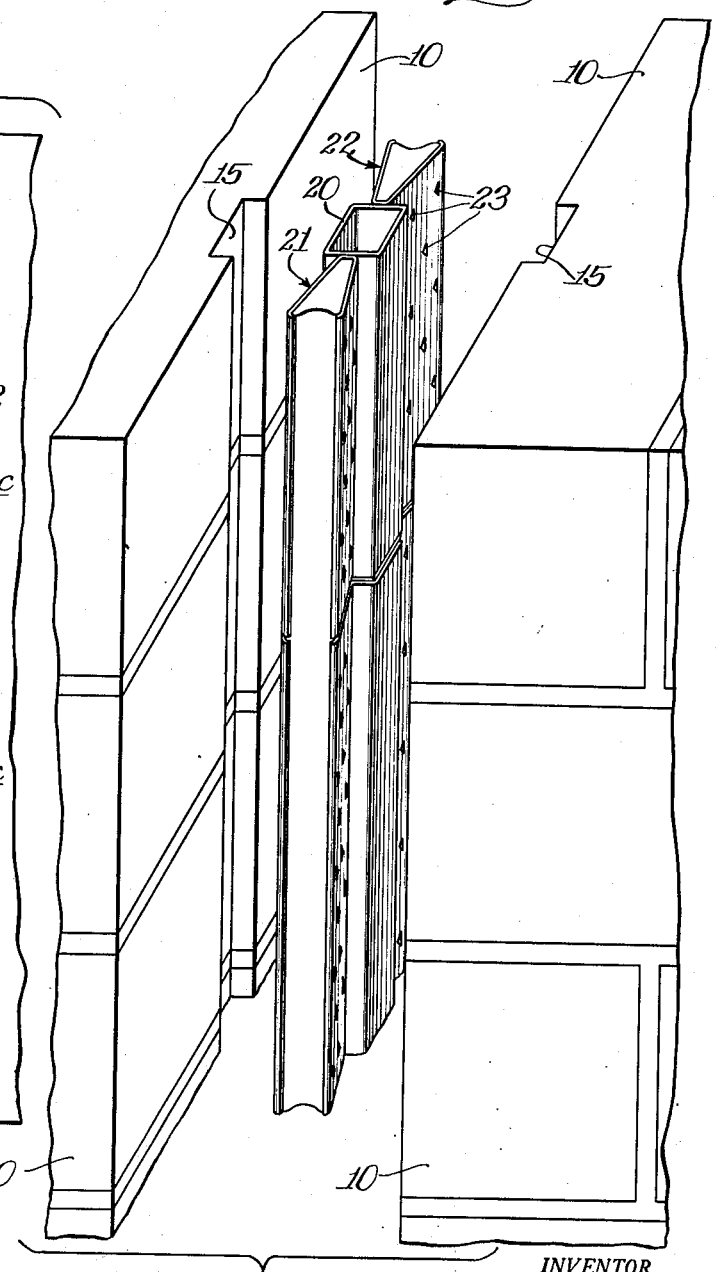
INVENTOR.
Harold L. Spaight,
BY Schroeder, Merriam,
Hofgren & Brady
Atty's

Patented June 8, 1954

2,680,370

UNITED STATES PATENT OFFICE 2,680,370

MASONRY JOINT STRUCTURE

Harold L. Spaight, Cedar Rapids, Iowa

Application July 1, 1950, Serial No. 171,655

6 Claims. (Cl. 72—107)

This invention relates to a masonry joint structure, and more particularly to an expansion joint for preventing cracks and leaks in masonry construction.

One feature of the invention is that it provides an improved masonry joint structure; another feature of the invention is that it provides a masonry block wall having a straight vertical seam deliberately formed therein by spacing adjacent blocks in each horizontal course; another feature of the invention is that it provides a flexible joint which prevents cracks and leaks in a masonry wall having a straight vertical seam deliberately formed therein; a further feature of the invention is that it provides an elongated channel member adapted to be positioned in the space between adjacent masonry blocks, said channel member having legs of resilient material forming a body which is partially closed by engagement with the masonry blocks to cause a plastic filler in the jaw to bulge out of the jaw into yieldable sealing engagement with the blocks; still another feature of the invention is that means are provided on the legs of the channel member for preventing displacement of the filler from the jaw; yet a further feature of the invention is that the channel member is secured to a body member adapted to engage the blocks for holding the channel member in position in the space between the blocks; an additional feature of the invention is that the body member has a reduced end portion formed to telescopically engage a similar body member to join a plurality of members in aligned relation; still a further feature of the invention is that the masonry blocks are recessed to receive the body members, said body members preventing relative movement between the wall portion on either side of the seam in directions transverse of the plane of the wall; and yet another feature of the invention is that it provides a novel and improved method of constructing a wall of masonry blocks.

Other features and advantages of the invention will be apparent from the following detailed description, and from the drawings in which:

Fig. 1 is a fragmentary front elevational view of a masonry construction having a seam sealed by the novel joint structure; Fig. 2 is a vertical section taken along the line 2—2 of Fig. 1; Fig. 3 is an enlarged fragmentary transverse section taken along the line 3—3 of Fig. 2 and turned through 90°, the parts being shown in one position in broken lines and in another position in solid lines; Fig. 4 is a fragmentary elevational view, partly in section of the joint structure; Fig. 5 is a transverse section along the line 5—5 of Fig. 4; Fig. 6 is an enlarged fragmentary elevational view of a modified form of joint structure; Fig. 7 is a top plan view of the apparatus of Fig. 6; Fig. 8 is a top elevational exploded view of a wall section and including the novel joint structure of the present application; and Fig. 9 is an isometric view of the device shown in Fig. 8.

In masonry constructions, as constructions of brick, tile, glass blocks, concrete blocks, etc., cracks are liable to occur which are not only unsightly, but which permit water to leak through to the inside of the construction. Such cracks are most likely to occur in long unbroken expanses of wall or other masonry construction, and near doors, windows, or other openings in the construction. Such cracks are due to the fact that the masonry construction expands and contracts under the influence of varying temperatures and moisture content, and the construction is so rigid when the blocks are joined by mortar or any similar hard material that there is not enough yieldability in the construction to permit expansion and contraction without cracking. The present invention provides a novel and improved expansion joint which will permit normal expansion and contraction of the masonry construction without cracking, and which will maintain a seal to prevent leakage through the construction.

Referring now more particularly to the drawings, in Fig. 1, a masonry construction is shown in the form of a wall formed of a plurality of masonry blocks 10 which may be bricks, concrete blocks, tile, glass blocks, or the like. The masonry blocks 10 are laid in conventional manner, each block being positioned in a bed of mortar 11, and each full-length block overlapping two blocks in the underlying row. A window opening 12 is provided, and across the top of this opening a lintel 13 is laid to provide a solid support for blocks in the rows above the window.

During the construction of the wall a vertical seam 14 is deliberately made near the window, this seam extending in a straight line preferably throughout the entire height of the wall by leaving a space between adjacent blocks in each course or horizontal row which space is not filled with mortar, but which instead includes the improved joint. In order to provide for uniformity at the edges along the seam and the window opening, half-length blocks are used in alternate rows or courses. All the blocks which abut the seam have a recessed or cut-out portion 15 in the form of a vertical rectangular channel extending throughout the height of the end face of the block as shown in Fig. 3, for a purpose to be later described.

The joint structure itself comprises a plurality of elongated body members 20 here shown in the form of tubes which are rectangular in transverse cross-section, although other forms, as for example, cylindrical tubes or polygonal tubes such as shown in Fig. 7, may be employed. The body member 20 may measure about ⅞ of an inch to a side in transverse section, and may have walls about 1/16 of an inch thick. The cut-out portions 15 may be about 1 inch wide and about ¼ inch deep. At one end each of the body members 20 may have a reduced portion which is about ¾ inch long in the structure illustrated, and which tapers slightly toward the outer end of the reduced portion so that the reduced end may telescopically engage a similar body member to join a plurality of body members in aligned relation as shown in Figs. 2 and 4. I prefer that each body member be about 11 inches long from its upper end (as the parts appear in Fig. 2) to the shoulder formed by the reduced portion. With these dimensions, a plurality of body members may be joined and the connection between the body members will be at different points with relation to the blocks along the height of the wall. The body members are short enough that a mason can handle them easily as he builds the wall from the bottom up, the reduced end of each body member merely being driven into the upper end of another body member as the work progresses upwardly. The telescopically arranged body members form a continuous rigid "key" as seen in Fig. 3 to prevent relative movement between the wall portions on either side of the seam in directions transverse of the plane of the wall. The wall portions on either side of the seam are locked together by the chain of body members so that neither wall portion can get out of alignment.

Each body member 20 has a pair of similar elongated channel members designated generally at 21 and 22. Each channel member is substantially as long as the body member as shown in Fig. 4, and each channel member has a base 21a and 22a, respectively. These bases are secured, as by welding or other means, to the body member 20 on opposite sides thereof. Each channel member has legs 21b, 21c and 22b and 22c which are of resilient material, as for example, spring steel. A plurality of tabs or tongues 23 project from the inner surface of each of the legs and extend in the direction of the body portion to provide a plurality of barb-like projections as seen best in Fig. 4. While these tabs may comprise separate pieces secured to the legs, I prefer to punch the tabs out from the material of the legs.

As may be seen best in Fig. 3, the legs of each channel member when in unstressed condition diverge to form a jaw with an opening wider than the space between the blocks, which space forms the seam 14 and preferably is a little more than ¼ inch wide.

Before the joint structure is placed in the space between the blocks, and preferably when the jaws of the channel members are in completely unstressed condition, a plastic filler 25 such as a mastic or other form of tar or other non-setting plastic material, is placed in the jaws in a sufficient amount to substantially fill the jaws when the legs are in an unstressed condition as shown in Fig. 5. When the jaws are in a stressed condition as shown in solid lines in Fig. 3, the jaw is partially closed and the filler 25 bulges out of the jaw opening into yieldable sealing engagement with the spaced blocks 10 on opposite sides of the body member 20 to provide a leak-proof joint which is expansible and which will not crack under varying temperature conditions.

In the construction of a wall or other masonry structure, assuming one of the masonry blocks in any horizontal row (as the lower block 10 of Fig. 3) to be in position, the joint is placed in position with the body member 20 in the cut-out portion 15 of the block and with the legs of the channel members in the space which will provide the seam 14 when the adjacent block is laid in spaced relationship. During this operation, the legs 21c and 22c will engage the face of the lower block 10 and move from their dotted line position to their solid line position. When the upper block 10 is laid, the legs 21b and 22b engage said block and will be moved from their broken line position to their solid line position so that the legs extend substantially parallel to each other and the jaw is partially closed to cause the mastic or filler 25 to bulge out into sealing engagement with both adjacent blocks. Preferably the bases 21a and 22a are slightly narrower than the width of the seam 14. The tabs 23 prevent displacement of the filler from the jaws of the channel members, and the location of the body member 20 in the cut-out portions 15 holds the channel members in position in the space forming the seam 14. Should the wall expand so that the blocks move closer toward each other to make the seam more narrow, the resilient material of the arms will yield to cause the arms to move closer together and force more of the non-setting filler into the space between the blocks. Should the wall contract so that the blocks move away from each other to widen the seam, the engagement of the tabs 23 will tend to draw the mastic back between the jaws, and under all conditions a leak-proof seal will be maintained and no cracks will occur. The wall portions on either side of the seam are locked together by the "key" formed by the rigid, telescoping body members 20, and neither portion of the wall can move out of alignment with the other despite the fact that there is no mortar in the seam.

If desired, in order to present a uniform appearance with the mortar joints of the wall, a little tuck-pointing material 26, preferably of a non-setting type, may be used in the outer edges of the seam, although the seam is crack-proof and leak-proof without such tuck-pointing material.

Figs. 6 and 7 show a modified form of the device wherein a body member 40 has centrally disposed ridges 40a and 40b extending throughout the length of opposite sides thereof, and base portions 41a and 42a of channel members 41 and 42 are secured to these ridges. As in the construction of Figs. 1–5, the channel members have arms 41b and 41c and 42b and 42c, respectively, and tabs 43 project from the inner surfaces of these arms. The operation of the joint of Figs. 6 and 7 is similar to the operation of the joint of Figs. 1–5. The main portion of the body 40 is positioned in cut-out portions of spaced adjacent blocks with the ridges 40b extending into the seam provided between these blocks, and the arms of each channel member are moved from the unstressed position shown in Fig. 5 to a stressed position similar to that shown in Fig. 3.

When in unstressed condition, the opening between the arms is wider than the space provided by the seam so that when the joint is positioned in the space between adjacent blocks, a filler material is caused to bulge out of the jaws of the channel members, into sealing engagement with the blocks on opposite sides of the body member 40. This form provides an even more positive "key" or lock to prevent misalignment of the wall portions adjacent the seam.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. An expansion joint seal of the character described, comprising: an elongated body member; a pair of similar elongated channel members attached to said body member, said channel members each having a base secured to the body member on opposite sides thereof and each channel member having a pair of diverging legs of resilient material which in unstressed condition form a jaw with a wide opening, each jaw being compressible to cause a plastic filler to bulge out of the opening formed by a pair of jaws into yieldable sealing engagement with a masonry wall; means on at least one leg of each channel member for preventing displacement of said filler from said jaws; and means on one end of the body member for securing said body member to and in alignment with a similar body member.

2. A wall portion formed of preformed masonry blocks, said blocks being disposed in a plurality of horizontal courses, each course of blocks being interrupted along a common vertical plane, the blocks on each side of said vertical plane and immediately adjacent thereto being spaced apart, the spaced blocks forming a continuous vertical seam in said wall portion; an elongated channel member adapted to be positioned vertically in said seam, said channel member having a base of no greater width than said seam and having legs of resilient material which in unstressed condition diverge to form a jaw with an opening wider than said seam, said jaw being partially closed by contact with adjacent blocks; a plastic filler substantially filling said jaw and bulging out of said opening; a plurality of tabs projecting from the inner surface of each of said legs and extending in the direction of said base with said tabs preventing displacement of said filler from said jaw; and a member positioned in said seam and held therein by contact with adjacent blocks, said member being secured to said base and holding said channel member in position in said seam.

3. A wall portion formed of preformed masonry blocks, said blocks being disposed in a plurality of horizontal courses, each course of blocks being interrupted along a common vertical plane, the blocks on each side of said vertical plane and immediately adjacent thereto being spaced apart, the spaced blocks forming a continuous vertical seam in said wall portion, the faces of the adjacent ends of the blocks in each course which face the vertical seam having vertically extended recesses therein, said recesses of each course being aligned and forming a vertically extending groove throughout said wall portion; an elongated body member positioned in said groove, said member being wider than the space between said spaced apart blocks; an elongated channel member having a base secured to said body member and having legs of resilient material, which in unstressed condition diverge to form a jaw with an opening wider than the space between said spaced apart blocks, with said legs engaging said faces of said spaced apart blocks; and a plastic filler in said jaw bulging out of said opening into yieldable sealing engagement with the faces of said spaced apart blocks.

4. A wall portion formed of a plurality of preformed masonry blocks, said blocks being disposed in a plurality of horizontal courses, each course of blocks being interrupted along a common vertical plane, the blocks on each side of said vertical plane and immediately adjacent thereto being spaced apart, the spaced blocks forming a continuous vertical seam in said wall portion, the faces of the adjacent ends of the blocks in each course which face the vertical seam having vertically extending recesses therein, said recesses of each course being aligned and forming a vertically extending groove throughout said wall portion; an elongated body member positioned in said groove, said member being wider than the space between said spaced apart blocks and fitting into said groove and locking together the masonry blocks on either side of said space preventing relative movement between said adjacent blocks in directions transverse of the depth of said space and groove; and an elongated channel member having a base secured to said body member and having legs of resilient material which in unstressed condition diverge to form a jaw with an opening wider than the space between said spaced apart blocks, said jaw being partially closed by engagement of said legs with said spaced apart blocks; and a plastic filler substantially filling said jaw when said legs are in unstressed condition, said filler bulging out of said opening into yieldable sealing engagement with said spaced apart blocks.

5. A wall portion formed of a plurality of preformed masonry blocks, said blocks being disposed in a plurality of horizontal courses, each course of blocks being interrupted along a common vertical plane, the blocks on each side of said vertical plane and immediately adjacent thereto being spaced part, the spaced blocks forming a continuous vertical seam in said wall portion, the faces of the adjacent ends of the blocks in each course which face the vertical seam having vertically extending recesses therein, said recesses of each course being aligned and forming a vertically extending groove throughout said wall portion; a plurality of elongated body members of rectangular transverse cross section positioned in said groove, said members being wider than the space between said spaced apart blocks and each having a reduced end portion telescopically engaging a similar adjacent body member whereby said body members are joined in rigidly aligned relation, said aligned members fitting into said groove and locking together the masonry blocks on either side of said seam and preventing relative movement between said spaced apart blocks on either side of said seam in horizontal directions transverse to the depth of said seam and groove; a plurality of pairs of similar elongated channel members, each channel member being substantially as long as a body member and each pair of channel members having their bases secured to a respective body member on opposite sides thereof, each channel member having legs of resilient material which in unstressed condition diverge to form a jaw with an opening wider than the space between said spaced apart blocks, each jaw being partially closed by engagement of said legs with said spaced apart blocks; a plastic filler substantially filling said jaws when said legs are in unstressed condition, said filler bulging out of said opening into yieldable sealing engagement with said spaced apart blocks on opposite sides of said body member; and a plurality of tabs projecting from the inner surface of each of said legs and extending in the direction of said body member for preventing displacement of said filler from said jaws.

6. A wall portion formed of a plurality of preformed masonry blocks, said blocks being disposed in a plurality of horizontal courses, each course of blocks being interrupted along a common vertical plane, the blocks on each side of said vertical plane and immediately adjacent thereto being spaced apart, the spaced blocks forming a continuous vertical seam in said wall portion, the faces of the adjacent ends of the blocks in each course which face the vertical seam having vertically extending recesses therein, said recesses of each course being aligned and forming a vertically extending groove throughout said wall portion; a plurality of elongated body members positioned in vertical alignment in the groove, said members being wider than the space between said spaced apart blocks; a pair of similar elongated channel members attached to each body member, said channel members each having a base secured to a body member on opposite sides thereof and each channel member having legs of resilient material which in unstressed condition diverge to form a jaw with an opening wider than said seam, each jaw being partially closed by engagement of said legs with said faces of the spaced apart blocks; a plastic filler in each jaw bulging out of said opening into yieldable sealing engagement with said blocks on opposite sides of said body member; and means on at least one leg of each channel member for preventing displacement of said filler from said jaws.

References Cited in the file of this patent

UNITED STATES PATENTS

| Number | Name | Date |
|---|---|---|
| 639,961 | De Man | Dec. 26, 1899 |
| 1,033,431 | McCarthy | July 23, 1912 |
| 1,122,866 | Cordes | Dec. 29, 1914 |
| 1,280,173 | Cutler | Oct. 1, 1918 |
| 1,806,275 | Adler | May 19, 1931 |
| 1,953,846 | Briggs | Apr. 3, 1934 |
| 1,997,546 | Fischer | Apr. 9, 1935 |
| 2,042,408 | Lawrence | May 26, 1936 |
| 2,125,857 | Fischer | Aug. 2, 1938 |
| 2,140,997 | Hohl | Dec. 20, 1938 |
| 2,174,940 | Hutchisson | Oct. 3, 1939 |
| 2,457,908 | Meyerhoefer | Jan. 4, 1949 |